US012572971B2

(12) United States Patent
Haze et al.

(10) Patent No.: US 12,572,971 B2
(45) Date of Patent: ***Mar. 10, 2026

(54) ARTIFICIAL CROWD INTELLIGENCE VIA NETWORKING RECOMMENDATION ENGINES

(71) Applicant: SAP Portals Israel Ltd., Ra'Anana (IL)

(72) Inventors: Oren Haze, Kfar Saba (IL); Yihezkel Schoenbrun, Ra'Anana (IL)

(73) Assignee: SAP Portals Israel Ltd., Ra'Anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,139

(22) Filed: Nov. 13, 2023

(65) Prior Publication Data

US 2024/0078588 A1 Mar. 7, 2024

Related U.S. Application Data

(63) Continuation of application No. 17/898,230, filed on Aug. 29, 2022, now Pat. No. 11,854,060, which is a
(Continued)

(51) Int. Cl.
*G06Q 30/0601* (2023.01)
*G06F 16/9535* (2019.01)
(Continued)

(52) U.S. Cl.
CPC ..... *G06Q 30/0631* (2013.01); *G06F 16/9535* (2019.01); *G06F 18/217* (2023.01); *G06N 20/00* (2019.01)

(58) Field of Classification Search
CPC ...... G06Q 30/0631; G06N 20/00; G06N 3/02; G06N 3/08; G06N 5/04; G06F 16/9535;
(Continued)

(56) References Cited

U.S. PATENT DOCUMENTS

| | | | | |
|---|---|---|---|---|
| 9,292,552 B2 * | 3/2016 | Arngren | .............. | G06F 16/2228 |
| 10,706,450 B1 * | 7/2020 | Tavernier | ............ | G06F 16/9535 |

(Continued)

FOREIGN PATENT DOCUMENTS

GB      2444520 A    6/2008

OTHER PUBLICATIONS

"U.S. Appl. No. 16/451,480, Examiner Interview Summary mailed Feb. 15, 2022", 3 pgs.
(Continued)

*Primary Examiner* — Evan Aspinwall
(74) *Attorney, Agent, or Firm* — SCHWEGMAN LUNDBERG & WOESSNER, P.A.

(57) ABSTRACT

Techniques for implementing artificial crowd intelligence via networking of recommendation engines are disclosed. In some example embodiments, a base recommendation engine performs a computer-implemented method comprising: receiving a recommendation request; generating a first plurality of recommendations based on the recommendation request using a base recommendation model; obtaining one or more other recommendations from one or more other recommendation engines, each one of the other recommendation engines being configured to generate the other recommendations based on the recommendation request using a corresponding recommendation model; obtaining a corresponding weight for the other recommendation engine(s); selecting at least one recommendation from the first plurality of recommendations and the other recommendation(s) using the corresponding weight(s); and causing the selected recommendation(s) to be displayed.

20 Claims, 10 Drawing Sheets

Related U.S. Application Data continuation of application No. 16/451,480, filed on Jun. 25, 2019, now Pat. No. 11,429,682.

(51) Int. Cl.
*G06F 18/21* (2023.01)
*G06N 20/00* (2019.01)

(58) Field of Classification Search
CPC ............. G06F 18/217; G06F 16/24578; G06F 16/24575; G06F 16/235; G06F 16/355; G06F 16/313
USPC ........................................................ 707/734
See application file for complete search history.

(56) References Cited

U.S. PATENT DOCUMENTS

| | | | |
|---|---|---|---|
| 11,429,682 | B2 | 8/2022 | Haze et al. |
| 11,854,060 | B2 | 12/2023 | Haze et al. |
| 2009/0150528 | A1 | 6/2009 | Tanabe et al. |
| 2013/0339931 | A1 | 12/2013 | Rode |
| 2014/0279745 | A1* | 9/2014 | Esponda ............... G06N 5/043 706/12 |
| 2015/0081449 | A1* | 3/2015 | Ge ........................ G06F 3/0482 705/14.66 |
| 2016/0224803 | A1* | 8/2016 | Frank .................. G06F 21/6245 |
| 2016/0350831 | A1 | 12/2016 | Tolia et al. |
| 2018/0032721 | A1* | 2/2018 | De ........................ G06F 21/566 |
| 2018/0316735 | A1* | 11/2018 | Yang ........................ H04L 65/61 |
| 2018/0357511 | A1* | 12/2018 | Misra ..................... G06N 5/025 |
| 2019/0139085 | A1* | 5/2019 | Lee ........................ G06Q 50/01 |
| 2019/0171438 | A1* | 6/2019 | Franchitti ................ G06N 3/08 |
| 2019/0200244 | A1 | 6/2019 | Polepalli |
| 2019/0213498 | A1* | 7/2019 | Adjaoute ............... G06N 3/126 |
| 2020/0134083 | A1* | 4/2020 | Elliman ............... G06F 3/0482 |
| 2020/0151610 | A1* | 5/2020 | Chueh .................... G06N 20/20 |
| 2020/0202256 | A1* | 6/2020 | Chaudhari ............. G06F 18/23 |
| 2020/0211073 | A1 | 7/2020 | Kim et al. |
| 2020/0311568 | A1* | 10/2020 | Xue ....................... G06N 20/00 |
| 2020/0410017 | A1 | 12/2020 | Haze et al. |
| 2022/0012268 | A1* | 1/2022 | Ghoshal ............... G06F 16/906 |
| 2023/0071653 | A1 | 3/2023 | Haze et al. |

OTHER PUBLICATIONS

"U.S. Appl. No. 16/451,480, Non Final Office Action mailed Nov. 16, 2021", 21 pgs.

"U.S. Appl. No. 16/451,480, Notice of Allowance mailed Apr. 27, 2022", 10 pgs.

"U.S. Appl. No. 16/451,480, Response filed Feb. 16, 2022 to Non Final Office Action mailed Nov. 16, 2021", 19 pgs.

"U.S. Appl. No. 17/898,230, Non Final Office Action mailed Mar. 24, 2023", 26 pgs.

"U.S. Appl. No. 17/898,230, Notice of Allowance mailed Aug. 23, 2023", 10 pgs.

"U.S. Appl. No. 17/898,230, Preliminary Amendment filed Nov. 22, 2022", 11 pgs.

"U.S. Appl. No. 17/898,230, Response filed Jun. 23, 2023 to Non Final Office Action mailed Mar. 24, 2023", 4 pgs.

"Artificial neural network", Wikipedia, [Online]. Retrieved from the Internet: <URL: https://en.wikipedia.org/wiki/Artificial_neural_network>, (Accessed Dec. 1, 2020), 22 pgs.

"Crowdsourcing", Wikipedia, [Online]. Retrieved from the Internet: <URL: https://en.wikipedia.org/wiki/Crowdsourcing>, (Accessed Dec. 1, 2020), 30 pgs.

"European Application Serial No. 20165744.2, Extended European Search Report", 9 pgs.

"Network theory", Wikipedia, [Online]. Retrieved from the Internet: <URL: https://en.wikipedia.org/wiki/Network_theory>, (Accessed Dec. 1, 2020), 10 pgs.

"Neural networks, explained", Physics World, [Online]. Retrieved from the Internet: <URL: https://physicsworld.com/a/neural-networks-explained/>, (Jul. 9, 2018), 6 pgs.

"European Application Serial No. 20165744.2, Communication pursuant to Article 94(3) EPC mailed Jul. 9, 2024", 13 pgs.

\* cited by examiner 600-1

| WEIGHTS FOR RECOMMENDATION ENGINE 410-1 | |
| --- | --- |
| SOURCE OF RECOMMENDATIONS | WEIGHT |
| RECOMMENDATION ENGINE 410-2 | 0.4 |
| RECOMMENDATION ENGINE 410-3 | 0.3 |

600-2

| WEIGHTS FOR RECOMMENDATION ENGINE 410-2 | |
| --- | --- |
| SOURCE OF RECOMMENDATIONS | WEIGHT |
| RECOMMENDATION ENGINE 410-1 | 0.4 |
| RECOMMENDATION ENGINE 410-3 | 0.7 |

600-3

| WEIGHTS FOR RECOMMENDATION ENGINE 410-3 | |
| --- | --- |
| SOURCE OF RECOMMENDATIONS | WEIGHT |
| RECOMMENDATION ENGINE 410-1 | 0.7 |
| RECOMMENDATION ENGINE 410-2 | 0.5 |

800

| RANK | RECOMMENDATION | SCORE | ENGINE |
|------|----------------|-------|--------|
| 1 | RECOMMENDATION-1 | 0.93 | 410-1 |
| 2 | RECOMMENDATION-2 | 0.87 | 410-1 |
| 3 | RECOMMENDATION-3 | 0.86 | 410-3 |
| 4 | RECOMMENDATION-4 | 0.78 | 410-2 |
| 5 | RECOMMENDATION-5 | 0.73 | 410-1 |
| 6 | RECOMMENDATION-6 | 0.72 | 410-2 |
| . . . | . . . | . . . | . . . |
| N | RECOMMENDATION-N | 0.04 | 410-3 |

ARTIFICIAL CROWD INTELLIGENCE VIA NETWORKING RECOMMENDATION ENGINES

CROSS-REFERENCE TO RELATED APPLICATIONS

This application is a continuation of prior application Ser. No. 17/898,230, filed on Aug. 29, 2022, which is a continuation of prior application Ser. No. 16/451,480, filed on Jun. 25, 2019, which applications are incorporated by reference herein in their entireties.

TECHNICAL FIELD

The present application relates generally to the technical field of electrical computer systems, and, in various embodiments, to systems and methods of implementing artificial crowd intelligence via networking of recommendation engines.

BACKGROUND

Existing machine-learning-based recommendation engines depend on input data considered to be directly relevant to the problem being solved. This data comes from sources within the same system or from connected systems within the same Line of Business (LOB) or domain. Although directly-relevant data from one's own LOB helps produce high-quality recommendations, this existing approach fails to identify useful inputs from other LOBs and domains because existing recommendation engines do not network with and leverage other recommendation engines. This technical problem of functional isolation of recommendation engines from one another leads to another technical problem of a lack of accuracy and quality in the recommendations generated by recommendation systems. The present disclosure addresses these and other technical problems that plague the computer functionality of recommendation systems.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
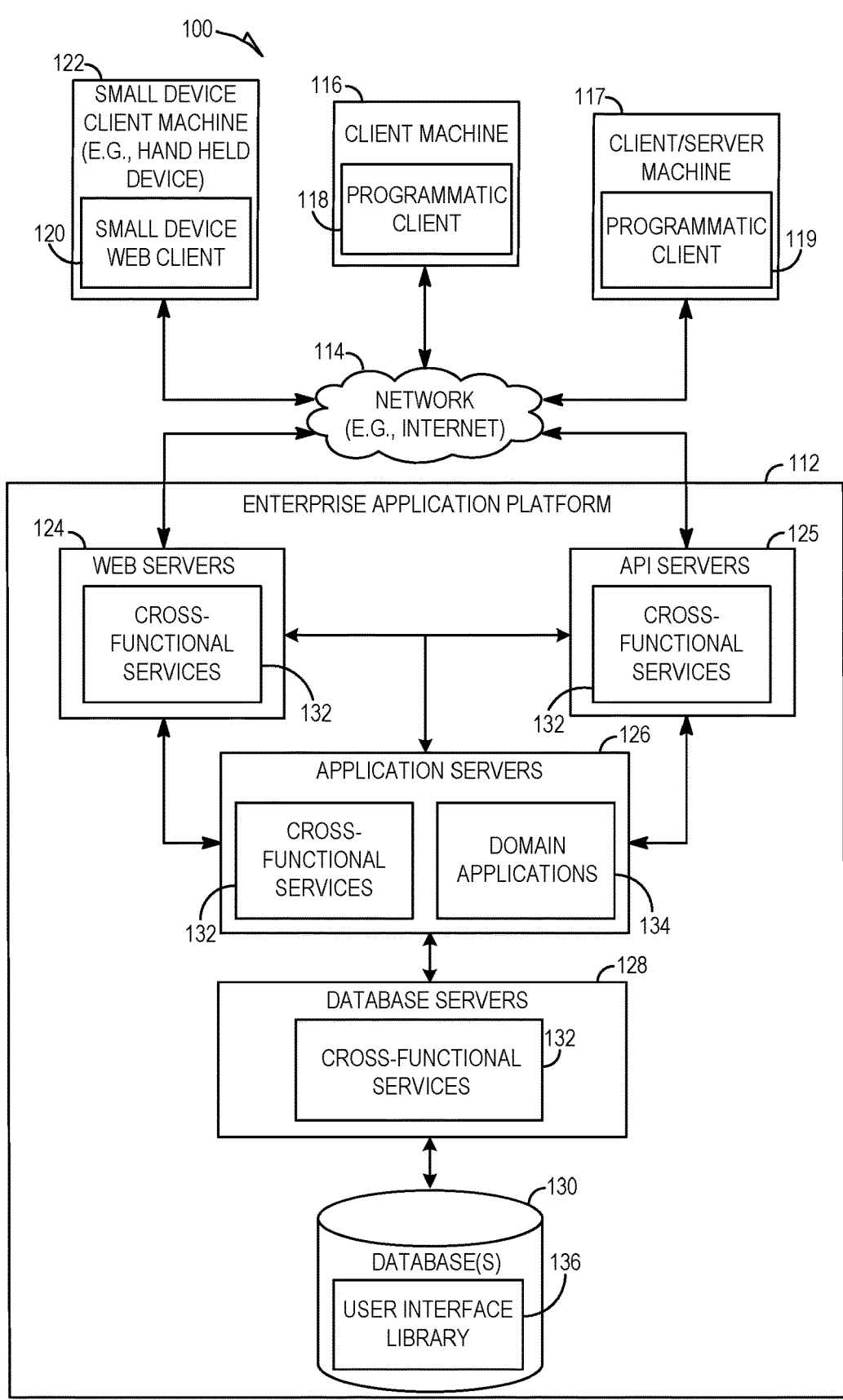
FIG. 1 is a network diagram illustrating a client-server system, in accordance with some example embodiments.

Example methods and systems for implementing artificial crowd intelligence via networking of recommendation engines are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is configured to implement artificial crowd intelligence in which a base recommendation engine leverages recommendations from other recommendation engines via a networked system of recommendation engines. By networking with other recommendation engines, the base recommendation engine may identify useful recommendations that were previously unavailable, thereby improving the accuracy and quality of the base recommendation system. As a result of the features disclosed herein, the functioning of the recommendation system is improved. Other technical effects will be apparent from this disclosure as well.

One of the biggest challenges in even the most advanced machine learning systems is the impact of bias, such as a biased training dataset, on skewing a recommendation engine's recommendations. Using the features of the present disclosure, this bias is reduced by networking different recommendation engines for their artificial crowd intelligence to identify further meaningful connections between input data to have a positive impact on improving recommendations, as additional independent factors which positively impact the recommendations helps obscure biases. Instead of each recommendation engine working as an isolated silo, the system of the present disclosure networks different recommendation engines from both the same and from different LOBs and application domains. Additionally, considering the output from a diversity of other recommendation engines, including from other LOBs or other application domains, enhances the recommendations of the base recommendation engine. Furthermore, by analyzing feedback data for the recommendations generated by these other recommendation engines, new connections can be identified and incorporated into improved models for the base recommendation engine.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are, of course, not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-8.

Figure 2:
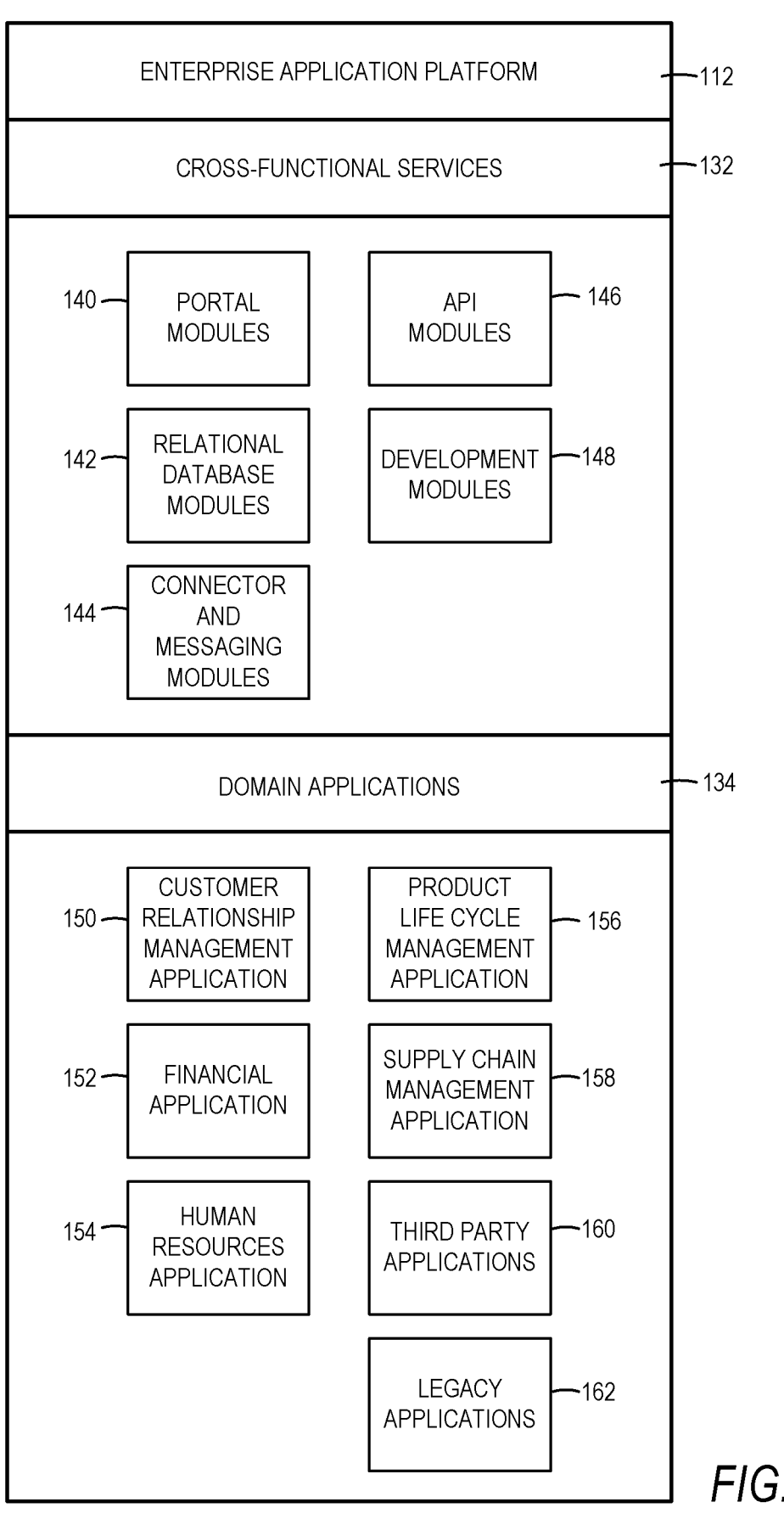
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
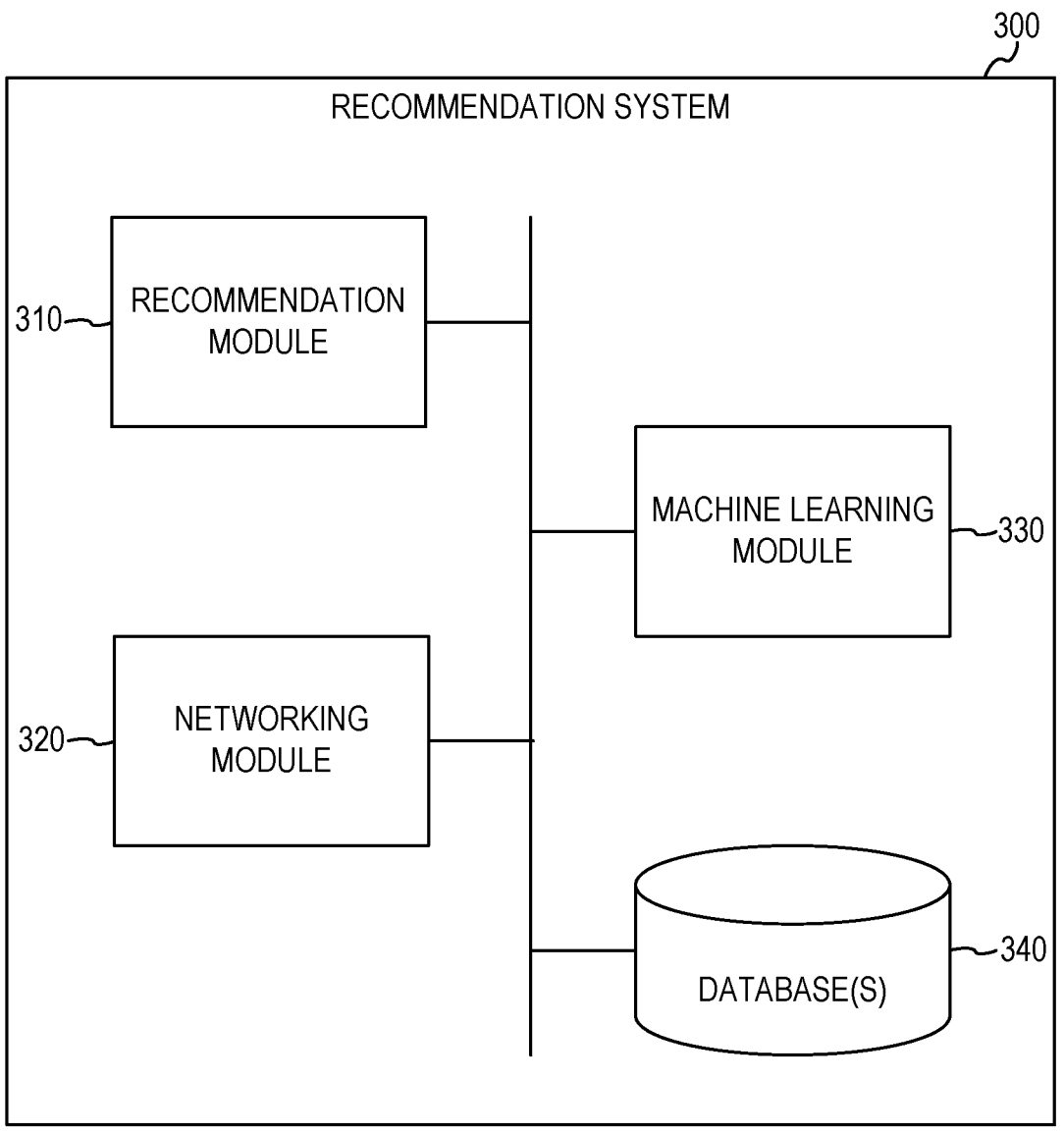
FIG. 3 is a block diagram illustrating a recommendation system, in accordance with some example embodiments.

FIG. 3 is a block diagram illustrating a recommendation system 300, in accordance with some example embodiments. In some embodiments, the recommendation system 300 comprises any combination of one or more of a recommendation module 310, a networking module 320, a machine learning module 330, and one or more database(s) 340. The modules 310, 320, and 330 and the database(s) 340 can reside on a computer system, or other machine, having a memory and at least one processor (not shown). In some embodiments, the modules 310, 320, and 330 is incorporated into the application server(s) 126 in FIG. 1 and the database(s) 340 is incorporated into the database(s) 130 in FIG. 1. However, it is contemplated that other configurations of the modules 310, 320, and 330 and the database(s) 340 are also within the scope of the present disclosure.

In some example embodiments, one or more of the modules 310, 320, and 330 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, and 330 are configured to receive user input. For example, one or more of the modules 310, 320, and 330 can present one or more GUI elements (e.g., drop-down menu, selectable buttons, text field) with which a user can submit input. In some example embodiments, one or more of the modules 310, 320, and 330 is configured to perform various communication functions to facilitate the functionality described herein, such as by communicating with a computing device (e.g., the client machine 122, the client machine 116, or the client machine 117) via the network 114 using a wired or wireless connection.

Figure 4:
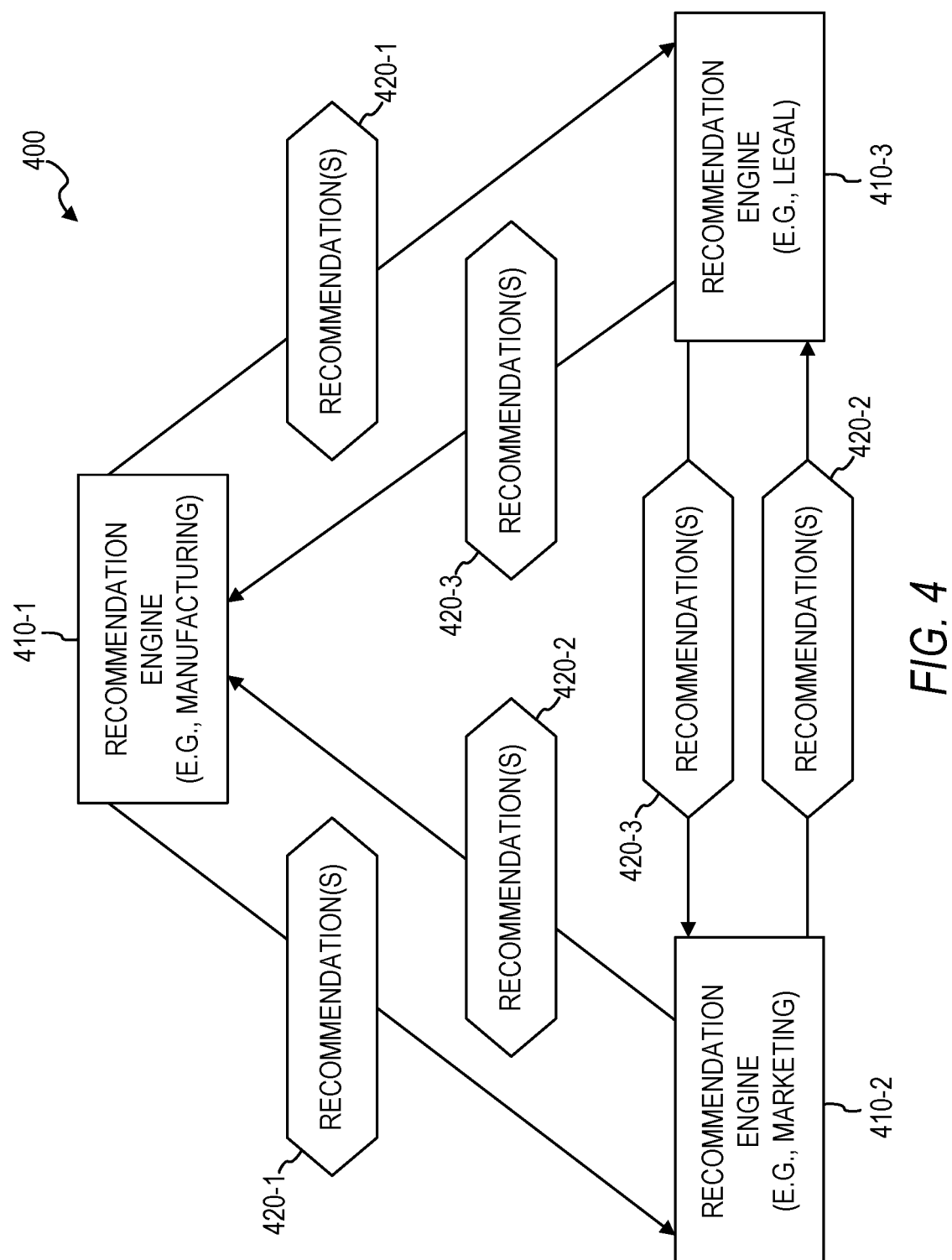
FIG. 4 illustrates a network environment in which recommendation engines use recommendations from other recommendation engines, in accordance with some example embodiments.

In some example embodiments, the recommendation system 300 is configured to enable a base recommendation engine to network with other recommendation engines to use the recommendations of the other recommendation engines in responding to a recommendation request. FIG. 4 illustrates a network environment 400 in which recommendation engines 410 use recommendations 420 from other recommendation engines 410, in accordance with some example embodiments. Although the example shown in FIG. 4 includes three different recommendation engines 410-1, 410-2, and 410-3, other numbers of recommendation engines are also within the scope of the present disclosure. In some example embodiments, each recommendation engine 410 comprises its own dedicated instance of the recommendation system 300 incorporated into the recommendation engine 410.

In any particular instance in which a recommendation engine 410 receives a recommendation request, the recommendation engine 410 that received the recommendation request is referred to as the base recommendation engine, and the other recommendation engines 410 from which the base recommendation engine obtains other recommendations are referred to as other recommendation engines. In one example, the recommendation engine 410-1 receives a recommendation request and is therefore the base recommendation engine for the example, while the other recommendation engines 410-2 and 410-3 are the other recommendation engines.

The recommendation engines 410-1, 410-2, and 410-3 may each be configured to serve a particular category of organizational functions different one another, such as different LOB's. In some example embodiments, the recommendation engines 410-1, 410-2, and 410-3 each have their own application domain, which is different from the application domains of the other recommendation engines 410. An application domain is a mechanism (e.g., similar to a process in an operating system) used to isolate executed software applications from one another so that they do not affect each other. Each application domain has its own virtual address space which scopes the resources for the application domain using that address space.

In one example, the recommendation engine 410-1 is configured to serve a manufacturing division or department of an organization via its own corresponding application domain, the recommendation engine 410-2 is configured to serve a marketing division or department of the organization via its own corresponding application domain, and the recommendation engine 410-3 is configured to serve a legal division or department of the organization via its own corresponding application domain. Each recommendation engine 410 is configured to generate recommendations 420 that may be used by the other recommendation engines 410. For example, the base recommendation engine 410-1 is configured to generate recommendations 420-1, the other recommendation engine 410-2 is configured to generate recommendations 420-2, and the other recommendation engine 410-3 is configured to generate recommendations 420-3.

In some example embodiments, the recommendation module 310 of the base recommendation engine 410-1 is configured to receive a recommendation request from a computing device. The recommendation request may comprise a request for any type of recommendation. For example, the recommendation request may comprise a request for online content or for a recommendation of an action to perform. Examples of online content include, but are not limited to, search results for a search query included in the recommendation request, an online coupon to display to an end user, an online advertisement (e.g., online banner ad) to display to an end user, a recommendation of online media content (e.g., a movie recommendation), online feed items (e.g., news feed content items), and online job postings. Examples of a recommendation of an action to perform include, but are not limited to, a recommendation to move an inventory item from one location to another location, a recommendation to manufacture a particular amount of specific product, and a recommendation to purchase a particular equipment item for use in manufacturing.

In some example embodiments, the recommendation module 310 of the base recommendation engine 410-1 is configured to generate a first plurality of recommendations based on the recommendation request using a base recommendation model. The base recommendation model may comprise a function configured to generate recommendation scores for recommendation candidates based on one or more factors or parameters, and the base recommendation model may then select one or more of the recommendation candidates to be used as a recommendation based on the recommendation scores. For example, the base recommendation model may rank the recommendation candidates based on their recommendation scores (e.g., in descending order), and then select a top-ranked portion of the recommendation candidates (e.g., the five highest ranked recommendation candidates, the top five percent of ranked recommendation candidates), or may use a threshold recommendation score to select the recommendation candidates having a corresponding recommendation score that meets the threshold recommendation score (e.g., the recommendation candidates having a recommendation score of 0.75 or higher).

In some example embodiments, the networking module 320 of the base recommendation engine 410-1 is configured to obtain a corresponding set of one or more other recommendations 420 from one or more other recommendation engines 410. Each one of the one or more other recommendation engines 410 may be configured to generate the corresponding set of one or more other recommendations 420 based on the recommendation request using a corresponding recommendation model different from the base recommendation model used by the base recommendation engine 410. For example, although the corresponding recommendation models of the other recommendation engines 410-2 and 420-3 may also comprise a function configured to generate recommendation scores for recommendation candidates based on one or more factors or parameters, and may be configured to select one or more of the recommendation candidates to be used as a recommendation based on the recommendation scores, the function used by the other recommendation engine 410-2 may be different from the function used by base recommendation engine 410-1 and the other recommendation engine 410-3, and the function used by the other recommendation engine 410-3 may also be different from the function used by the base recommendation engine 410-1 and the other recommendation engine 410-3.

Figure 5:
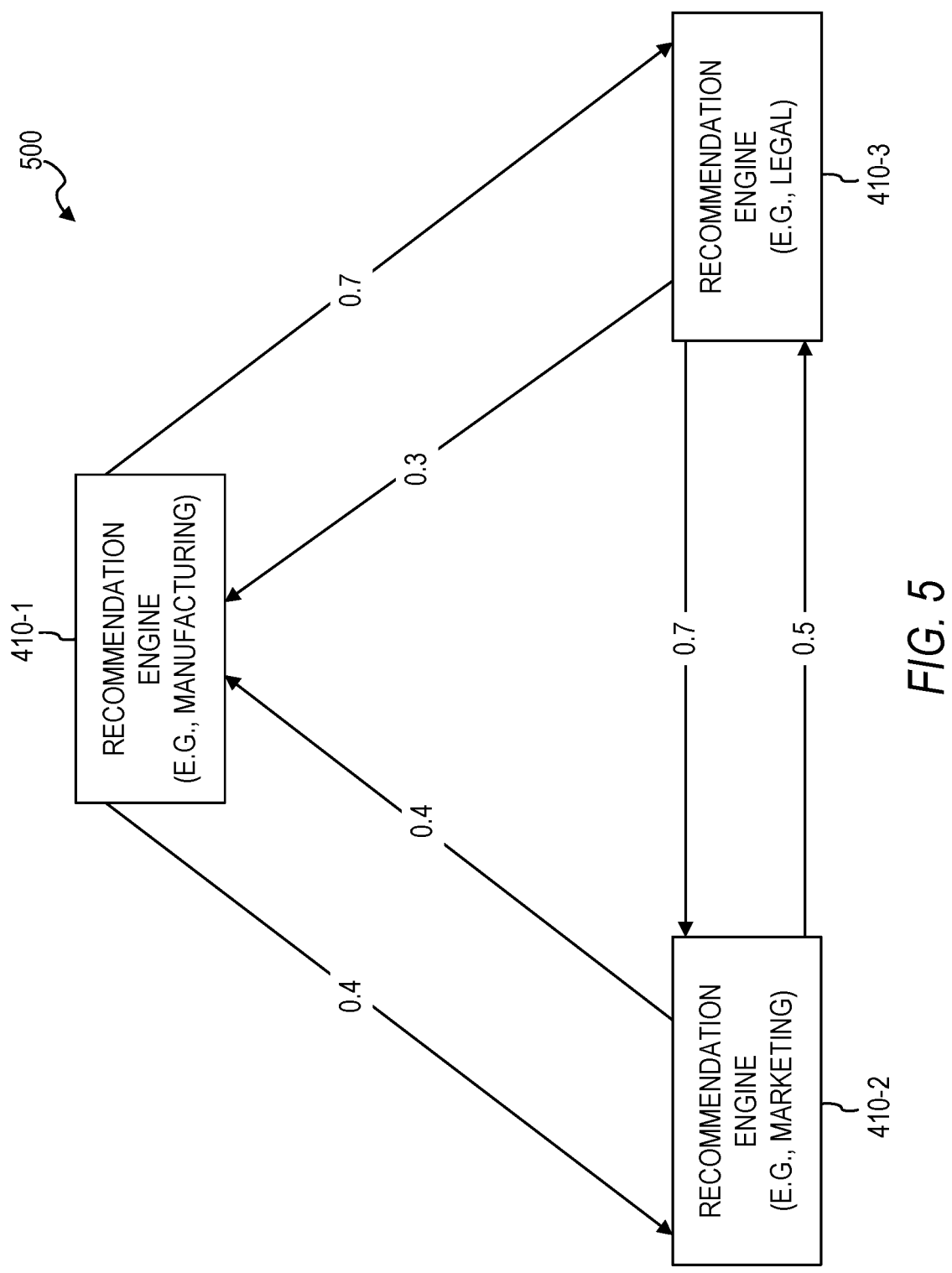
FIG. 5 illustrates a network environment in which recommendation engines weight recommendations from other recommendation engines, in accordance with some example embodiments.

In some example embodiments, the networking module 320 of the base recommendation engine 410-1 is configured to, for each of the other recommendations engines 410-2 and 410-3, obtain a corresponding weight for the other recommendation engines 410-2 and 410-3 for use in weighting the recommendations 420-2 and 420-3 from the other recommendation engines 410-2 and 410-3. FIG. 5 illustrates a network environment 500 in which recommendation engines weight recommendations from other recommendation engines, in accordance with some example embodiments. In FIG. 5, the network environment 500 is similar to the network environment 400 in FIG. 4, except that the recommendations 420 are replaced with their corresponding weights. As illustrated by the arrows and weights in FIG. 5, the recommendation system 300 implements independent bidirectional weights for the recommendations between different recommendation engines 410. These weights represent both reliability and credibility of the recommendations. In the example shown in FIG. 5, the recommendations 420-1 generated by the recommendation engine 410-1 have a weight of 0.4 when being used by the recommendation engine 410-2 and a weight of 0.7 when being used by the recommendation engine 410-3, the recommendations 420-2 generated by the recommendation engine 410-2 have a weight of 0.4 when being used by the recommendation engine 410-1 and a weight of 0.5 when being used by the recommendation engine 410-3, and the recommendations 420-3 generated by the recommendation engine 410-3 have a weight of 0.3 when being used by the recommendation engine 410-1 and a weight of 0.7 when being used by the recommendation engine 410-2.

Figure 6:
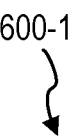
FIG. 6 illustrates tables of stored associations of corresponding weights for recommendations from other recommendation engines, in accordance with some example embodiments.
Figure 6:
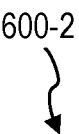
Figure 6:
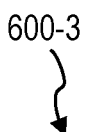

FIG. 6 illustrates tables 600 of stored associations of corresponding weights for recommendations from other recommendation engines, in accordance with some example embodiments. Each table 600 corresponds to weights used by a base recommendation engine for recommendations from other recommendation engines. For example, the table 600-1 comprises corresponding weights that are used by the recommendation engine 410-1 for recommendations obtained from the recommendation engine 410-2 and the recommendation engine 410-3, the table 600-2 comprises corresponding weights that are used by the recommendation engine 410-2 for recommendations obtained from the recommendation engine 410-1 and the recommendation engine 410-3, and the table 600-3 comprises corresponding weights that are used by the recommendation engine 410-3 for recommendations obtained from the recommendation engine 410-1 and the recommendation engine 410-2. The weights may be stored, managed, and retrieved from the database(s) 340.

In some example embodiments, the recommendation module 310 of the base recommendation engine 410-1 is configured to select at least one recommendation from the pool of recommendations formed from the first plurality of recommendations 420-1 generated by the base recommendation engine 410-1 and each corresponding set of one or more other recommendations 420-1 and 420-3 from the one or more other recommendation engines 410-2 and 420-3 using each corresponding weight for each set of one or more other recommendations 420-2 and 420-3 from the one or more other recommendation engines 410-2 and 410-3. The recommendation module 310 may select the recommendation(s) based on the recommendation scores. For example, the recommendation module 310 may rank the pool of recommendations based on their recommendation scores (e.g., in descending order), and then select a top-ranked portion of the recommendations (e.g., the five highest ranked recommendations, the top five percent of ranked recommendations), or may use a threshold recommendation score to select the recommendations having a corresponding recommendation score that meets the threshold recommendation score (e.g., the recommendations having a recommendation score of 0.75 or higher).

In some example embodiments, the recommendation module 310 of the base recommendation engine 410-1 is configured to cause the selected at least one recommendation to be displayed on the computing device. The selected recommendation(s) may be displayed in association with the recommendation request. For example, the selected recommendation(s) may comprise search results that are displayed in association with a search query of the recommendation request. In some example embodiments, the selected recommendation(s) comprises at least one recommendation of online content or at least one recommendation to perform an action. However, other types of recommendations are also within the scope of the present disclosure.

In some example embodiments, the machine learning module 330 of the base recommendation engine 410-1 is configured to receive corresponding feedback data for each one of the selected recommendation(s), and then use the received feedback data as training data in at least one machine learning operation to modify the corresponding weight of at least one of the one or more other recommendation engines stored in the database. The feedback data may indicate a reaction by a user of the computing device to the display of the selected recommendation(s) on the computing device. For example, the base recommendation engine 410-1 and the other recommendation engines 410-2 and 410-3 may track whether the user selects to perform an online action (e.g., view, purchase) directed towards the recommendation(s) or ignores or rejects the recommendation(s). These tracked reactions may be stored in the database(s) 340 and used as feedback data. The machine learning module 330 may aggregate and combine the different recommendation algorithms scores, feedback data, and the business priority together, as well as update the recommendation models (e.g., the weights used in the recommendation models) based on the end user feedback, thereby enabling the recommendation system 300 to learn and adapt continuously. Over time, the effectiveness of a recommendation from one recommendation engine 410 on the recommendation for another recommendation engine 410 will either increase or reduce the dynamic weights accordingly. The success of recommendations can be evaluated, via such approaches as click rate and purchase/cart abandonment rates. As a result, each recommendation engine may obtain a better understanding of how useful each other recommendation engine is in enhancing its own recommendations.

Figure 7:
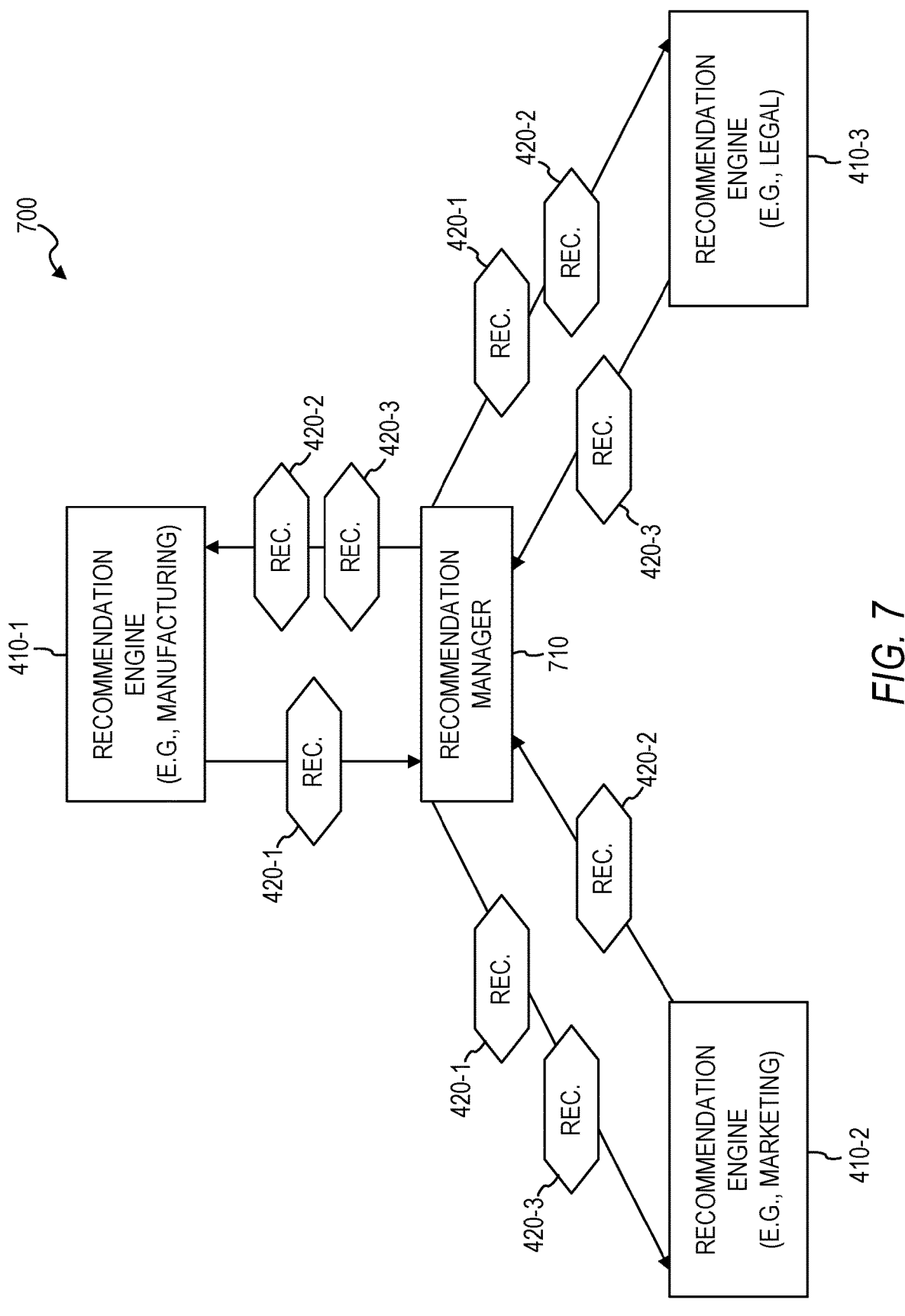
FIG. 7 illustrates another network environment in which recommendation engines use recommendations from other recommendation engines via a central recommendation manager, in accordance with some example embodiments.

Although FIG. 4 shows the base recommendation engine 410-1 obtaining other recommendations 420-2 and 420-3 directly from the other recommendation engines 410-2 and 420-3 via a direct network connection between the base recommendation engine 410-1 and the other recommendation engines 410-2 and 410-3, in some example embodiments, other recommendations 420-2 and 420-3 are obtained via a management server that is separate and distinct from the base recommendation engine 410-1. FIG. 7 illustrates another network environment 700 in which recommendation engines 410 use recommendations 420 from other recommendation engines 410 via a central recommendation manager 710, in accordance with some example embodiments. In some example embodiments, the central management server 710 is configured to obtain the corresponding set of one or more other recommendations 420-2 and 420-3 from each one of the other recommendation engines 410-2 and 420-3, and then transmit the corresponding set of one or more other recommendations 420-2 and 420-3 to the base recommendation engine 410-1. The weights for the recommendation engines 410 may be stored, managed, and obtained from the central recommendation manager 710.

In some example embodiments, the base recommendation engine 410-1 is configured to detect a switchover event corresponding to one or more of the other recommendation engines 410-2 and 420-3, such as a network disconnection or other unavailability of the other recommendation engines 420-2 and 420-3), and, based on the detected switchover event, obtain the corresponding set of one or more other recommendations from the other recommendation engine to which the switchover event corresponds via the central management server 710. As a result of this switchover capability, the recommendation system 300 solves the technical problem of network disconnections and other situations that make another recommendation engine unavailable.

Figure 8:
FIG. 8 illustrates a ranking of recommendations from multiple different recommendation engines for use in selection of recommendations, in accordance with some example embodiments.

FIG. 8 illustrates a ranking 800 of recommendations from multiple different recommendation engines for use in selection of recommendations, in accordance with some example embodiments. In some example embodiments, the recommendation module 310 ranks the recommendations generated by the base recommendation engine 410-1 along with the recommendations generated by and obtained from the other recommendation engines 410-2 and 410-3 based on their corresponding recommendation scores, such as in descending order of recommendation scores. The recommendation module 310 may then select one or more of the recommendations for response to the recommendation request based on the ranking 800. For example, the recommendation module 310 may select the top five ranked recommendations or the top five percent of ranked recommendations.

Figure 9:
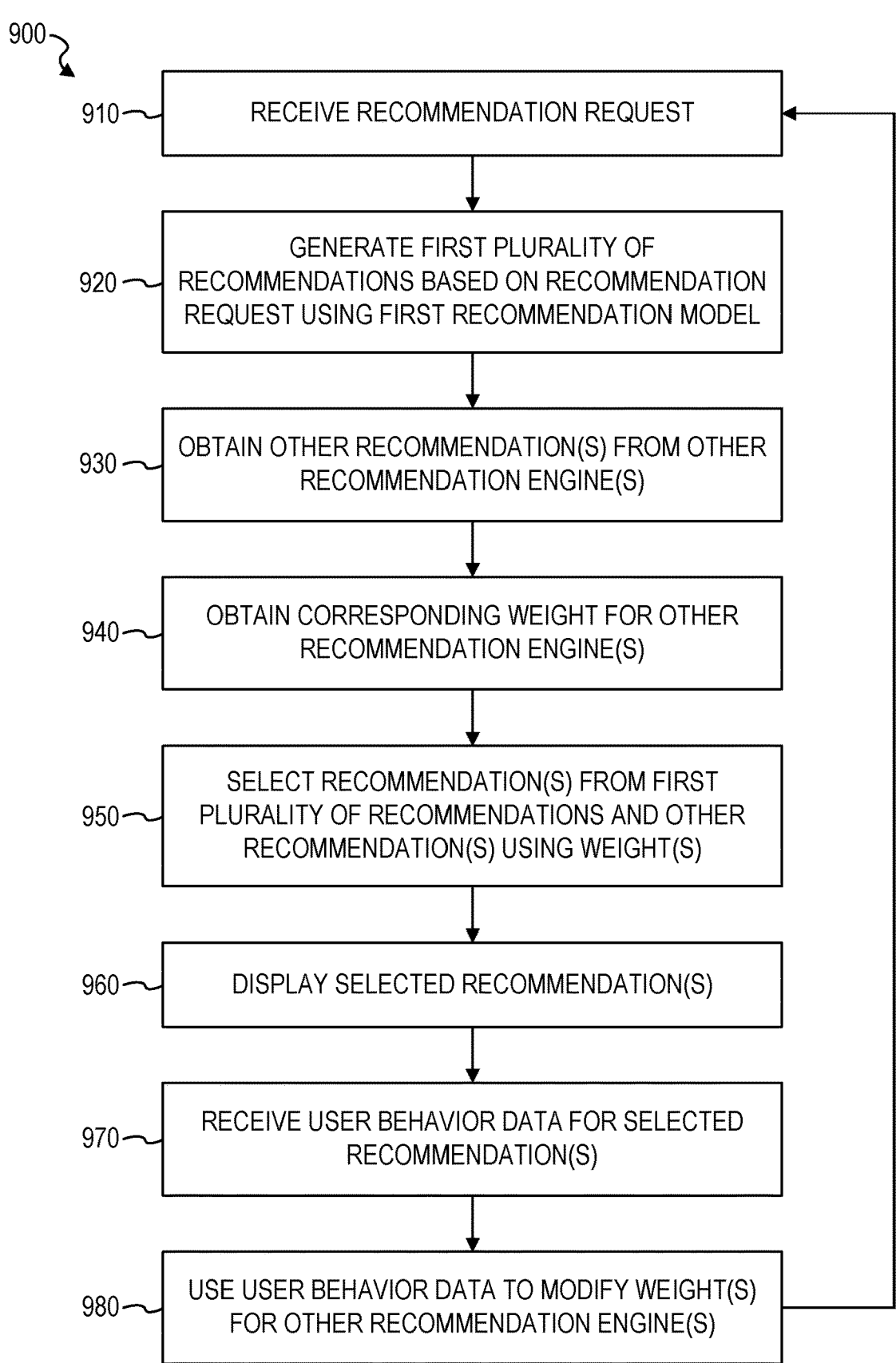
FIG. 9 is a flowchart illustrating a method of implementing artificial crowd intelligence via networking of recommendation engines, in accordance with some example embodiments.

FIG. 9 is a flowchart illustrating a method 900 of implementing artificial crowd intelligence via networking of recommendation engines, in accordance with some example embodiments. The method 900 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 900 are performed by a base recommendation engine in which the recommendation system of FIG. 3, or any combination of one or more of its modules 310, 320, and 330, is implemented as described above. However, in some example embodiments, one or more of the operations of the method 900 are additionally or alternatively performed by a management server (e.g., recommendation manager 510 in FIG. 5)

At operation 910, the base recommendation engine receives a recommendation request from a computing device. For example, the base recommendation engine may receive a request for online content, such as a search query, or a request for a recommendation of an action to perform, such as a request for a recommendation of an operation that an organization or a member of the organization should perform.

At operation 920, the base recommendation engine generates a first plurality of recommendations based on the recommendation request using a base recommendation model. The base recommendation model may take into account one or more parameters included in or otherwise associated with the recommendation request, such as search terms of a search query or an identification of a user for whom the recommendation request is being submitted. Other types of parameters are also within the scope of the present disclosure.

At operation 930, the base recommendation engine obtains a corresponding set of one or more other recommendations from one or more other recommendation engines. In some example embodiments, each one of the one or more other recommendation engines is configured to generate the corresponding set of one or more other recommendations based on the recommendation request using a corresponding recommendation model different from the base recommendation model. The base recommendation engine and each one of the one or more other recommendation engines may form a group of recommendation engines that are each configured to serve a particular category of organizational functions different from the particular category of organizational functions of all other recommendation engines in the group. The base recommendation engine and each one of the one or more other recommendation engines may form a group of recommendation engines that each have their own application domain different from the application domain of all other recommendation engines in the group. Other distinctions between the different recommendation engines are also within the scope of the present disclosure.

In some example embodiments, for each one of the one or more other recommendation engines, the corresponding set of one or more other recommendations are obtained from the one or more other recommendation engines via a direct network connection between the base recommendation engine and the one or more other recommendation engines. In other example embodiments, for each one of the one or more other recommendation engines, the corresponding set of one or more other recommendations are obtained from the one or more other recommendation engines via a management server that is separate and distinct from the base recommendation engine, where the management server is configured to obtain the corresponding set of one or more other recommendations from each one of the one or more other recommendation engines, and transmit the corresponding set of one or more other recommendations obtained from each one of the one or more other recommendation engines to the base recommendation engine.

In some example embodiments, the base recommendation engine is configured to obtain the corresponding set of one or more other recommendations from the one or more other recommendation engines via a direct network connection between the base recommendation engine and the one or more other recommendation engines, detect a switchover event corresponding to one of the one or more other recommendation engines, and, based on the detected switchover event, obtain the corresponding set of one or more other recommendations from the other recommendation engine to which the switchover event corresponds via a management server that is separate and distinct from the base recommendation engine. The management server may be configured to obtain the corresponding set of one or more other recommendations from the other recommendation engine to which the switchover event corresponds, and then transmit the corresponding set of one or more other recommendations obtained from the other recommendation engine to which the switchover event corresponds to the base recommendation engine.

At operation 940, the base recommendation engine, for each of the one or more other recommendations engines, obtains a corresponding weight for the other recommendation engine from a database. In some example embodiments, the base recommendation engine selects, from a plurality of recommendation engines, the one or more other recommendation engines to be used in the obtaining of the corresponding set of one or more other recommendations based on the corresponding weight for each one of the selected one or more other recommendation engines. In some example embodiments, the selecting of the one or more other recommendation engines comprises omitting at least one of the plurality of recommendation engines from selection based on the corresponding weight for the at least one of the plurality of recommendation engines.

Thereafter, at operation 950, the base recommendation engine selects at least one recommendation from the first plurality of recommendations and each corresponding set of one or more other recommendations from the one or more other recommendation engines using each corresponding weight for each set of one or more other recommendations from the one or more other recommendation engines. In some example embodiments, the selected at least one recommendation comprises at least one recommendation of online content or at least one recommendation to perform an action.

The base recommendation engine causes the selected at least one recommendation to be displayed on the computing device, at operation 960. In some example embodiments, the selected at least one recommendation is displayed in association with the recommendation request. For example, the selected at least one recommendation may comprise search results that are displayed in association with a search query of the recommendation request. In some example embodiments, the selected at least one recommendation comprises at least one recommendation of online content or at least one recommendation to perform an action. However, other types of recommendations are also within the scope of the present disclosure.

At operation 970, the base recommendation engine 410 receives corresponding feedback data for each one of the selected at least one recommendation. In some example embodiments, the feedback data indicates a reaction by a user of the computing device to the display of the selected at least one recommendation on the computing device. For example, the base recommendation engine and the other recommendation engines may track whether the user selects to perform an online action (e.g., view, purchase) directed towards the recommendation(s) or ignores or rejects the recommendation(s).

The base recommendation engine 410, as shown at operation 980, uses the received feedback data as training data in at least one machine learning operation to modify the corresponding weight of at least one of the one or more other recommendation engines stored in the database. The method 900 may then return to operation 910, where another recommendation request is received by the base recommendation engine, and the rest of the operations of the method 900 are performed using the modified weight(s).

It is contemplated that any of the other features described within the present disclosure can be incorporated into the method 900.

The features disclosed herein provide several technical benefits for the computer functionality of the recommendation system 300. Altogether new connections are identified, resulting in new input data to directly enhance a recommendation engine it hadn't been previously feeding, which may be represented by a situation in which the weight on an arrow pointing from a new recommendation engine in the network is higher than a threshold value. For example, it may not have been known that an environmental sustainability recommendation engine would enhance the results of a marketing recommendation Engine. However, such a connection may be uncovered via the networked system of the present disclosure, determining that, in fact, purchasing decisions are also influenced by the product's "green factor". Results are enhanced for each recommendation engine on the networked system by incorporating the recommendations from the other recommendation engines in the network. For example, such a network may establish how effective a legal recommendation engine and a marketing recommendation engine are as inputs to a manufacturing recommendation engine. The result is that the manufacturing recommendation engine's recommendations will be more effective.

In effect, new per-context Recommendation Engines are dynamically created. For example, since legal recommendations and marketing recommendations may be meaningful inputs to a manufacturing recommendation engine, we might effectively have a new recommendation engine. It of course contains manufacturing's recommendation engine, but it also would be comprised of legal's recommendation engine with a weight of "a", and marketing's recommendation engine with a weight of "b". If legal's recommendations are more effective for manufacturing than marketing's recommendations, "a" will be greater than "b". Also, since these weights are directional, the weight of the manufacturing recommendation engine on the legal recommendation engine might be entirely different than the weight it has in the opposite direction. Furthermore, these weights are dynamic, with the weight of one recommendation engine on another changing over time with how relevant its recommendations are for the other.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
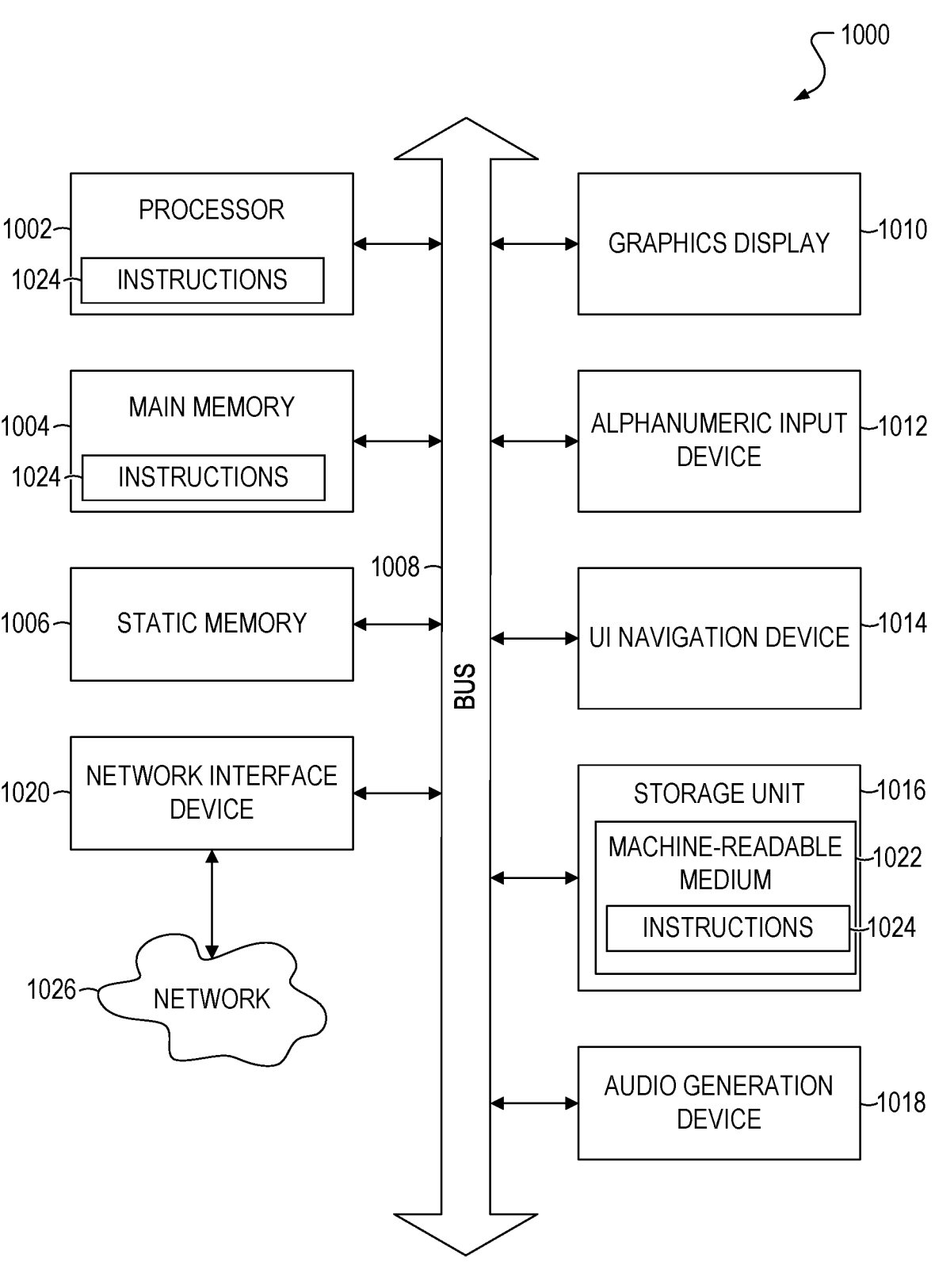
FIG. 10 is a block diagram of an example computer system on which methodologies described herein can be executed, in accordance with some example embodiments.

FIG. 10 is a block diagram of a machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via a bus 1008. The computer system 1000 may further include a graphics or video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit (e.g., a disk drive unit) 1016, an audio or signal generation device 1018 (e.g., a speaker), and a network interface device 1020.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be takenin a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have beenillustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

1. A computer-implemented method comprising:

receiving, by a base recommendation engine implemented using at least one hardware processor, a recommendation request from a computing device;

generating, by the base recommendation engine, a first plurality of recommendations based on the recommendation request using a base recommendation model;

obtaining, by the base recommendation engine, a corresponding set of one or more other recommendations from one or more other recommendation engines, each one of the one or more other recommendation engines being configured to generate the corresponding set of one or more other recommendations based on the recommendation request using a corresponding recommendation model different from the base recommendation model;

for each of the one or more other recommendations engines, obtaining, by the base recommendation engine, a corresponding weight for the other recommendation engine from a database;

selecting, by the base recommendation engine, at least one recommendation from the first plurality of recommendations and each corresponding set of one or more other recommendations from the one or more other recommendation engines using each corresponding weight for each set of one or more other recommendations from the one or more other recommendation engines; and causing, by the base recommendation engine, the selected at least one recommendation to be displayed on the computing device.

2. The computer-implemented method of example 1, further comprising:

receiving corresponding feedback data for each one of the selected at least one recommendation, the feedback data indicating a reaction by a user of the computing device to the display of the selected at least one recommendation on the computing device; and using the received feedback data as training data in at least one machine learning operation to modify the corresponding weight of at least one of the one or more other recommendation engines stored in the database.

3. The computer-implemented method of example 1 or example 2, wherein the base recommendation engine and each one of the one or more other recommendation engines form a group of recommendation engines that are each configured to serve a particular category of organizational functions different from the particular category of organizational functions of all other recommendation engines in the group.

4. The computer-implemented method of any one of examples 1 to 3, wherein the base recommendation engine and each one of the one or more other recommendation engines form a group of recommendation engines that each have their own application domain different from the application domain of all other recommendation engines in the group.

5. The computer-implemented method of any one of examples 1 to 4, wherein, for each one of the one or more other recommendation engines, the corresponding set of one or more other recommendations are obtained from the one or more other recommendation engines via a direct network connection between the base recommendation engine and the one or more other recommendation engines.

6. The computer-implemented method of any one of examples 1 to 5, wherein, for each one of the one or more other recommendation engines, the corresponding set of one or more other recommendations are obtained from the one or more other recommendation engines via a management server that is separate and distinct from the base recommendation engine, the management server being configured to:

obtain the corresponding set of one or more other recommendations from each one of the one or more other recommendation engines; and transmit the corresponding set of one or more other recommendations obtained from each one of the one or more other recommendation engines to the base recommendation engine.

7. The computer-implemented method of any one of examples 1 to 6, wherein the base recommendation engine is configured to:

for each one of the one or more other recommendation engines, obtain the corresponding set of one or more other recommendations from the one or more other recommendation engines via a direct network connection between the base recommendation engine and the one or more other recommendation engines;

detect a switchover event corresponding to one of the one or more other recommendation engines; and based on the detected switchover event, obtain the corresponding set of one or more other recommendations from the other recommendation engine to which the switchover event corresponds via a management server that is separate and distinct from the base recommendation engine, the management server being configured to:

obtain the corresponding set of one or more other recommendations from the other recommendation engine to which the switchover event corresponds; and transmit the corresponding set of one or more other recommendations obtained from the other recommendation engine to which the switchover event corresponds to the base recommendation engine.

8. The computer-implemented method of any one of examples 1 to 7, further comprising selecting, from a plurality of recommendation engines, the one or more other recommendation engines to be used in the obtaining of the corresponding set of one or more other recommendations based on the corresponding weight for each one of the selected one or more other recommendation engines.

9. The computer-implemented method of example 8, wherein the selecting the one or more other recommendation engines comprises omitting at least one of the plurality of recommendation engines from selection based on the corresponding weight for the at least one of the plurality of recommendation engines.

10. The computer-implemented method of any one of examples 1 to 9, wherein the selected at least one recommendation comprises at least one recommendation of online content or at least one recommendation to perform an action.

11. A system comprising:

at least one processor; and a non-transitory computer-readable medium storing executable instructions that, when executed, cause the at least one processor to perform the method of any one of examples 1 to 10.

12. A non-transitory machine-readable storage medium, tangibly embodying a set of instructions that, when executed by at least one processor, causes the at least one processor to perform the method of any one of examples 1 to 10.

13. A machine-readable medium carrying a set of instructions that, when executed by at least one processor, causes the at least one processor to carry out the method of any one of examples 1 to 10.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method of networking different content sources to implement artificial crowd machine learning intelligence, the computer-implemented method comprising:

in a grid comprising a plurality of different but interconnected recommendation engines, each recommendation engine contained within a different silo having its own application domain isolated from application domains of other recommendation engines and each recommendation engine having its own virtual address space:

receiving, by a first recommendation engine of the plurality of different recommendation engines, a content request from a computing device;

dynamically assigning the first recommendation engine to be a base recommendation engine by virtue of the first recommendation engine having received the content request;

generating, by the base recommendation engine, a first plurality of content items based on the content request using a base machine learning model;

obtaining, by the base recommendation engine, a corresponding set of one or more other content items from one or more other recommendation engines in the grid, each one of the one or more other recommendation engines being configured to generate corresponding content based on its own machine learning model different from the base machine learning model;

for each of the one or more other recommendation engines, obtaining, by the base recommendation engine, a corresponding component weight for each other recommendation engine, from a database, each component weight representing both reliability and credibility of a corresponding recommendation engine;

selecting, by the base recommendation engine, at least one content item from the first plurality of content items and each corresponding set of one or more other content items from the one or more other recommendation engines, the selecting being based on relevance of the at least one content item and each corresponding set of one or more other content items and also being based on, for the one or more content items from the one or more other recommendation engines, the component weight for each of the one or more other recommendation engines, thereby reducing bias introduced by any one recommendation engine; and causing, by the base recommendation engine, the selected at least one content item to be displayed on the computing device.

2. The computer-implemented method of claim 1, wherein the content request comprises a request for online content, the online content comprising search results for a search query included in the content request, an online coupon, an online advertisement, online media content, online news feed content items, or online job postings.

3. The computer-implemented method of claim 1, further comprising:

receiving corresponding feedback data for each one of the selected at least one content item, the feedback data indicating a reaction by a user of the computing device to the display of the selected at least one content item on the computing device; and using the received feedback data as training data in at least one machine learning operation to modify the corresponding component weight of at least one of the one or more other recommendation engines, stored in the database.

4. The computer-implemented method of claim 1, wherein the grid is configured to serve a particular category of organizational functions different from the particular category of organizational functions of all other recommendation engines in the group.

5. The computer-implemented method of claim 1, wherein, for each one of the one or more other recommendation engines, the corresponding set of one or more other content items are obtained from the one or more other recommendation engines via a direct network connection between the base recommendation engine and the one or more other recommendation engines.

6. The computer-implemented method of claim 1, wherein, for each one of the one or more other recommendation engines, the corresponding set of one or more other content items are obtained from the one or more other recommendation engines via a management server that is separate and distinct from the base recommendation engine, the management server being configured to:

obtain the corresponding set of one or more other content items from each one of the one or more other recommendation engines; and transmit the corresponding set of one or more other content items obtained from each one of the one or more other recommendation engines to the base recommendation engine software component.

7. The computer-implemented method of claim 1, wherein the base recommendation engine is configured to:

for each one of the one or more other recommendation engines, obtain the corresponding set of one or more other content items from the one or more recommendation engines via a direct network connection between the base recommendation engine and the one or more other recommendation engines;

detect a switchover event corresponding to one of the one or more other recommendation engines; and based on the detected switchover event, obtain the corresponding set of one or more other content items from the other recommendation engine to which the switchover event corresponds via a management server that is separate and distinct from the base recommendation engine, the management server being configured to:

obtain the corresponding set of one or more other content items from the other recommendation engine to which the switchover event corresponds; and transmit the corresponding set of one or more other content items obtained from the other recommendation engine to which the switchover event corresponds to the base recommendation engine.

8. The computer-implemented method of claim 1, further comprising selecting, from a plurality of recommendation engines, the one or more other recommendation engines to be used in the obtaining of the corresponding set of one or more other content items based on the corresponding component weight for each one of the selected one or more other recommendation engines.

9. The computer-implemented method of claim 8, wherein the selecting the one or more other recommendation engines comprises omitting at least one of the plurality of recommendation engines from selection based on the corresponding component weight for the at least one of the plurality of recommendation engines.

10. A system comprising:

at least one hardware processor; and a non-transitory computer-readable medium storing executable instructions that, when executed, cause the at least one hardware processor to perform operations comprising:

in a grid comprising a plurality of different but interconnected recommendation engines, each recommendation engine contained within a different silo having its own application domain isolated from application domains of other recommendation engines and each recommendation engine having its own virtual address space:

receiving, by a first recommendation engine of the plurality of different recommendation engines, a content request from a computing device;

dynamically assigning the first recommendation engine to be a base recommendation engine by virtue of the first recommendation engine having received the content request;

generating, by the base recommendation engine, a first plurality of content items based on the content request using a base machine learning model;

obtaining, by the base recommendation engine, a corresponding set of one or more other content items from one or more other recommendation engines in the grid, each one of the one or more other recommendation engines being configured to generate corresponding content based on its own machine learning model different from the base machine learning model;

selecting, by the base recommendation engine, at least one content item from the first plurality of content items and each corresponding set of one or more other content items from the one or more other recommendation engines, the selecting being based on relevance of the at least one content item; and causing, by the base recommendation engine, the selected at least one content item to be displayed on the computing device.

11. The system of claim 10, wherein the content request comprises a request for online content, the online content comprising search results for a search query included in the content request, an online coupon, an online advertisement, online media content, online news feed content items, or online job postings.

12. The system of claim 10, wherein the operations further comprise:

receiving corresponding feedback data for each one of the selected at least one content item, the feedback data indicating a reaction by a user of the computing device to the display of the selected at least one content item on the computing device; and using the received feedback data as training data in at least one machine learning operation to modify a corresponding component weight of at least one of the one or more other recommendation engines, stored in a database, the corresponding component weight used as a factor in the selecting.

13. The system of claim 10, wherein the grid is configured to serve a particular category of organizational functions different from the particular category of organizational functions of all other recommendation engines in the group.

14. The system of claim 10, wherein, for each one of the one or more other recommendation engines, the corresponding set of one or more other content items are obtained from the one or more other recommendation engines via a direct network connection between the base recommendation engine and the one or more other recommendation engines.

15. The system of claim 10, wherein, for each one of the one or more other recommendation engines, the corresponding set of one or more other content items are obtained from the one or more other recommendation engines via a management server that is separate and distinct from the base recommendation engine, the management server being configured to:

obtain the corresponding set of one or more other content items from each one of the one or more other recommendation engines; and transmit the corresponding set of one or more other content items obtained from each one of the one or more other recommendation engines to the base recommendation engine.

16. The system of claim 10, wherein the base recommendation engine is configured to:

for each one of the one or more other recommendation engines, obtain the corresponding set of one or more other content items from the one or more recommendation engines via a direct network connection between the base recommendation engine and the one or more other recommendation engines;

detect a switchover event corresponding to one of the one or more other recommendation engines; and based on the detected switchover event, obtain the corresponding set of one or more other content items from the other recommendation engine to which the switchover event corresponds via a management server that is separate and distinct from the base recommendation engine, the management server being configured to:

obtain the corresponding set of one or more other content items from the other recommendation engine to which the switchover event corresponds; and transmit the corresponding set of one or more other content items obtained from the other recommendation engine to which the switchover event corresponds to the base recommendation engine.

17. The system of claim 10, wherein the operations further comprise:

selecting, from a plurality of recommendation engines, the one or more other recommendation engines to be used in the obtaining of the corresponding set of one or more other content items based on a corresponding component weight for each one of the selected one or more other recommendation engines, the corresponding component weight used as a factor in the selecting.

18. A non-transitory machine-readable storage medium, tangibly embodying a set of instructions that, when executed by at least one hardware processor, causes the at least one processor to perform operations comprising:

in a grid comprising a plurality of different but interconnected recommendation engines, each recommendation engine contained within a different silo having its own application domain isolated from application domains of other recommendation engines and each recommendation engine having its own virtual address space:

receiving, by a first recommendation engine of the plurality of different recommendation engines, a content request from a computing device;

dynamically assigning the first recommendation engine to be a base recommendation engine by virtue of the first recommendation engine having received the content request;

generating, by the base recommendation engine, a first plurality of content items based on the content request using a base machine learning model;

obtaining, by the base recommendation engine, a corresponding set of one or more other content items from one or more other recommendation engines in the grid, each one of the one or more other recommendation engines being configured to generate corresponding content based on its own machine learning model different from the base machine learning model;

for each of the one or more other recommendation engines, obtaining, by the base recommendation engine, a corresponding component weight for each other recommendation engine, from a database, each component weight representing both reliability and credibility of a corresponding recommendation engine;

selecting, by the base recommendation engine, at least one content item from the first plurality of content items and each corresponding set of one or more other content items from the one or more other recommendation engines, the selecting being based on relevance of the at least one content item and each corresponding set of one or more other content items and also being based on, for the one or more content items from the one or more other recommendation engines, the component weight for each of the one or more other recommendation engines, thereby reducing bias introduced by any one recommendation engine; and causing, by the base recommendation engine, the selected at least one content item to be displayed on the computing device.

19. The computer-implemented method of claim 1, further comprising:

detecting a network disconnection that make the base recommendation engine unavailable; and in response to the detecting, automatically assigning a second recommendation engine to be the base recommendation engine.

20. The system of claim 10, wherein the operations further comprise:

detecting a network disconnection that make the base recommendation engine unavailable; and in response to the detecting, automatically assigning a second recommendation engine to be the base recommendation engine.

* * * * *